US008200229B2

(12) United States Patent
Kaikkonen et al.

(10) Patent No.: US 8,200,229 B2
(45) Date of Patent: Jun. 12, 2012

(54) APPARATUS, METHOD AND COMPUTER PROGRAM PROVIDING ENHANCED FRACTIONAL DEDICATED PHYSICAL CHANNEL DOWNLINK POWER CONTROL DURING SOFT HANDOVER

(75) Inventors: Jorma Kaikkonen, Oulu (FI); Sari Nielsen, Espoo (FI); Asbjörn Grovlen, Salo (FI)

(73) Assignee: Nokia Corporation, Espoo (FI)

( * ) Notice: Subject to any disclaimer, the term of this patent is extended or adjusted under 35 U.S.C. 154(b) by 1552 days.

(21) Appl. No.: 11/413,782

(22) Filed: Apr. 28, 2006

(65) Prior Publication Data

US 2006/0246907 A1    Nov. 2, 2006

Related U.S. Application Data

(60) Provisional application No. 60/676,276, filed on Apr. 29, 2005.

(51) Int. Cl.
*H04W 36/00* (2009.01)
(52) U.S. Cl. .......................... 455/442; 370/318; 370/331
(58) Field of Classification Search .................. 455/436
See application file for complete search history.

(56) References Cited

U.S. PATENT DOCUMENTS

| | | | |
|---|---|---|---|
| 6,085,108 A | 7/2000 | Knutsson et al. | 455/522 |
| 6,259,927 B1 | 7/2001 | Butovitsch et al. | 455/522 |
| 2002/0102976 A1* | 8/2002 | Newbury et al. | 455/436 |
| 2003/0083070 A1* | 5/2003 | Ishikawa et al. | 455/436 |
| 2003/0092463 A1* | 5/2003 | Charriere et al. | 455/522 |
| 2003/0202500 A1* | 10/2003 | Ha et al. | 370/342 |
| 2004/0116143 A1* | 6/2004 | Love et al. | 455/522 |
| 2005/0136961 A1* | 6/2005 | Simonsson et al. | 455/522 |
| 2005/0281222 A1* | 12/2005 | Ranta-Aho et al. | 370/328 |
| 2006/0274712 A1* | 12/2006 | Malladi et al. | 370/345 |

FOREIGN PATENT DOCUMENTS

| | | |
|---|---|---|
| EP | 0 936 751 A2 | 8/1999 |
| EP | 1 032 237 A1 | 8/2000 |
| EP | 1432141 A2 | 6/2004 |
| EP | 1437906 A1 | 7/2004 |
| WO | WO-03/019819 A1 | 3/2003 |
| WO | WO-2005/009070 A1 | 1/2005 |

OTHER PUBLICATIONS

3rd Generation Partnership Project; Technical Specification Group Radio Access Network; Physical layer procedures (FDD) Release 6, 3GPP TS 25.214, v6.5.0 (Mar. 2005).
Ericsson, "F-DPCH Downlink Power Control" Tdoc R1-050098, 3GPP TSG RAN WG1 Meeting #40, Scottsdale, AZ, USA Feb. 14-18, 2005.

\* cited by examiner

*Primary Examiner* — Marcos Batista
(74) *Attorney, Agent, or Firm* — Harrington & Smith LLC

(57) ABSTRACT

A method includes establishing a first radio link with a serving network entity and a second radio link with a target network entity, commencing a soft handover from the serving network entity to the target network entity, receiving a quality target from a network comprising the serving and target network entities, and applying the quality target only to the first radio link to generate a power control command.

15 Claims, 2 Drawing Sheets

APPARATUS, METHOD AND COMPUTER PROGRAM PROVIDING ENHANCED FRACTIONAL DEDICATED PHYSICAL CHANNEL DOWNLINK POWER CONTROL DURING SOFT HANDOVER

CROSS REFERENCE TO RELATED APPLICATION

This Application claims the benefit under 35 USC 119(e) of U.S. Provisional Application No. 60/676,276 filed Apr. 29, 2005.

TECHNICAL FIELD

The exemplary embodiments of this invention relate generally to digital cellular communications systems, methods, terminals and computer programs and, more specifically, relate to packet data transmission techniques for handing over a terminal from a currently serving cell to a next serving cell.

BACKGROUND

The following abbreviations, at least some of which appear in the description below, are defined as follows:
3GPP Third Generation Partnership Project
ARQ Automatic Repeat Request
BTS Base Transceiver Station
CFN Connection Frame Number
CPICH Common Pilot Channel
DL Downlink
DPCH Dedicated Physical Channel
F-DPCH Fractional Dedicated Physical Channel
H-ARQ Hybrid ARQ
HSDPA High-Speed Downlink Packet Access
HS-DPCCH High-Speed Dedicated Physical Control Channel
HS-DSCH High-Speed Downlink Shared Channel
HS-PDSCH High-Speed Physical Downlink Shared Channel
HS-SCCH High-Speed Shared Control Channel
MAC Medium Access Control
RLC Radio Link Control
RNC Radio Network Controller
RNTI Radio Network Temporary Identifier
RRC Radio Resource Control
SHO Soft Handover
SRB Signaling Radio Bearer
SIR Signal to Interference Ratio
TPC Transmit Power Control
TTI Transmission Time Interval
UE User Equipment
UL Uplink
UMTS Universal Mobile Telecommunications System C304
UTRA-FDD UMTS Terrestrial Radio Access-Frequency Division Duplex
UTRAN UMTS Terrestrial Radio Access Network
VoIP Voice Over Internet Protocol
WCDMA Wideband Code Division Multiple Access The DL packet data transmission in UTRA FDD (WCDMA) is a feature included in Release 6 of the 3GPP TS 25.214 technical specification with the support of fractional DPCH (F-DPCH), and with the support of SRB mapping on the HS-DSCH.

In order to reduce the code usage when HSDPA is deployed, the Fractional DPCH was introduced. With the F-DPCH, a new quality target for generating downlink power control commands by the UE is specified. More specifically, when the Fractional DPCH (F-DPCH) concept was originally approved it was decided that generating DL power control commands should be based on a quality target that uses a downlink TPC command error rate target value for F-DPCH. However, the issue of whether the quality criterion should be satisfied for all radio links when in SHO was left for further study.

One prior proposal in this area (R1-050098 F-DPCH Downlink Power Control, Ericsson) involves meeting the quality target for all radio links in the active set. However, this can lead to excessive power being used for transmitting F-DPCH. In large active sets some of the cells are typically not detectable, and fulfilling the quality criteria for the undetectable cell or cells will unnecessarily cause an increase in the power of the detectable cells.

SUMMARY OF THE PREFERRED EMBODIMENTS

The foregoing and other problems are overcome, and other advantages are realized, in accordance with the exemplary embodiments of these teachings.

In accordance with an exemplary embodiment of the invention, a method includes establishing a first radio link with a serving network entity and a second radio link with a target network entity, commencing a soft handover from the serving network entity to the target network entity, receiving a quality target from a network comprising the serving and target network entities, and applying the quality target only to the first radio link to generate a power control command.

In accordance with another exemplary embodiment of the invention, a method includes establishing a first radio link between a serving network entity and a UE and a second radio link between a target network entity and the UE, commencing a soft handover from the serving network entity to the target network entity, transmitting a quality target from a network comprising the serving network entity and the target network entity, and receiving a power control command from the UE generated in response to the transmission of the quality target using only the first radio link.

In accordance with another exemplary embodiment of the invention, a mobile terminal includes a wireless transceiver, a processor coupled to the wireless transceiver, and a memory coupled to the processor for storing a set of instructions, executable by the processor, for receiving a quality target and applying the quality target only to a F-DPCH radio link with a HS-DSCH serving cell to generate a power control command.

In accordance with another exemplary embodiment of the invention, a program of machine-readable instructions, tangibly embodied on an information bearing medium and executable by a digital data processor, performs actions directed toward handing over a mobile terminal between network entities, the actions including establishing a first radio link with a serving network entity and a second radio link with a target network entity, commencing a soft handover from the serving network entity to the target network entity, receiving a quality target from a network comprising the serving and target network entities, and applying the quality target only to the first radio link to generate a power control command.

In accordance with another exemplary embodiment of the invention, a network element includes an antenna, a transceiver coupled to the antenna, a processor coupled to the transceiver, and a memory coupled to the processor for storing a set of instructions, executable by the processor, for receiving a quality target and applying the quality target only to a F-DPCH radio link with a HS-DSCH serving cell to generate a power control command.

In accordance with another exemplary embodiment of the invention, a wireless communication system includes a serving network element comprising a first transceiver, a first digital processor and a first memory each coupled to one another and configured to wirelessly establish a first radio link with a mobile terminal, a target network element comprising a second transceiver, a second digital processor and a second memory each coupled to one another and configured to wirelessly establish a second radio link with the mobile terminal, wherein the mobile terminal comprises a third transceiver, a third digital processor and a third memory each coupled to one another and configured to wirelessly and simultaneously receive the first and second radio links, to receive a quality target from a network comprising the serving and target network entities, and to apply the quality target only to the first radio link to generate a power control command.

In accordance with another exemplary embodiment of the invention, a device includes an element for establishing a first radio link with a serving network entity and a second radio link with a target network entity, an element for commencing a soft handover from the serving network entity to the target network entity, an element for receiving a quality target from a network comprising the serving and target network entities, and an element for applying the quality target only to the first radio link to generate a power control command.

In accordance with another exemplary embodiment of the invention, an integrated circuit includes an element for receiving from a UTRAN a quality target comprising a downlink TPC command error rate target value for a F-DPCH belonging to a radio link from a HS-DSCH serving cell, an element for setting a SIR target value, and an element for adjusting the SIR target value to achieve the quality target.

In accordance with another exemplary embodiment of the invention, a program of machine-readable instructions, tangibly embodied on an information bearing medium and executable by a digital data processor, performs actions directed toward handing over a mobile terminal between network entities, the actions including receiving from a UTRAN a quality target comprising a downlink TPC command error rate target value for a F-DPCH belonging to a radio link from a HS-DSCH serving cell, setting a SIR target value, and adjusting the SIR target value to achieve the quality target.

BRIEF DESCRIPTION OF THE DRAWINGS

The foregoing and other aspects of the exemplary embodiments of this invention are made more evident in the following Detailed Description, when read in conjunction with the attached Drawing Figure, wherein.

DETAILED DESCRIPTION

Figure 1:
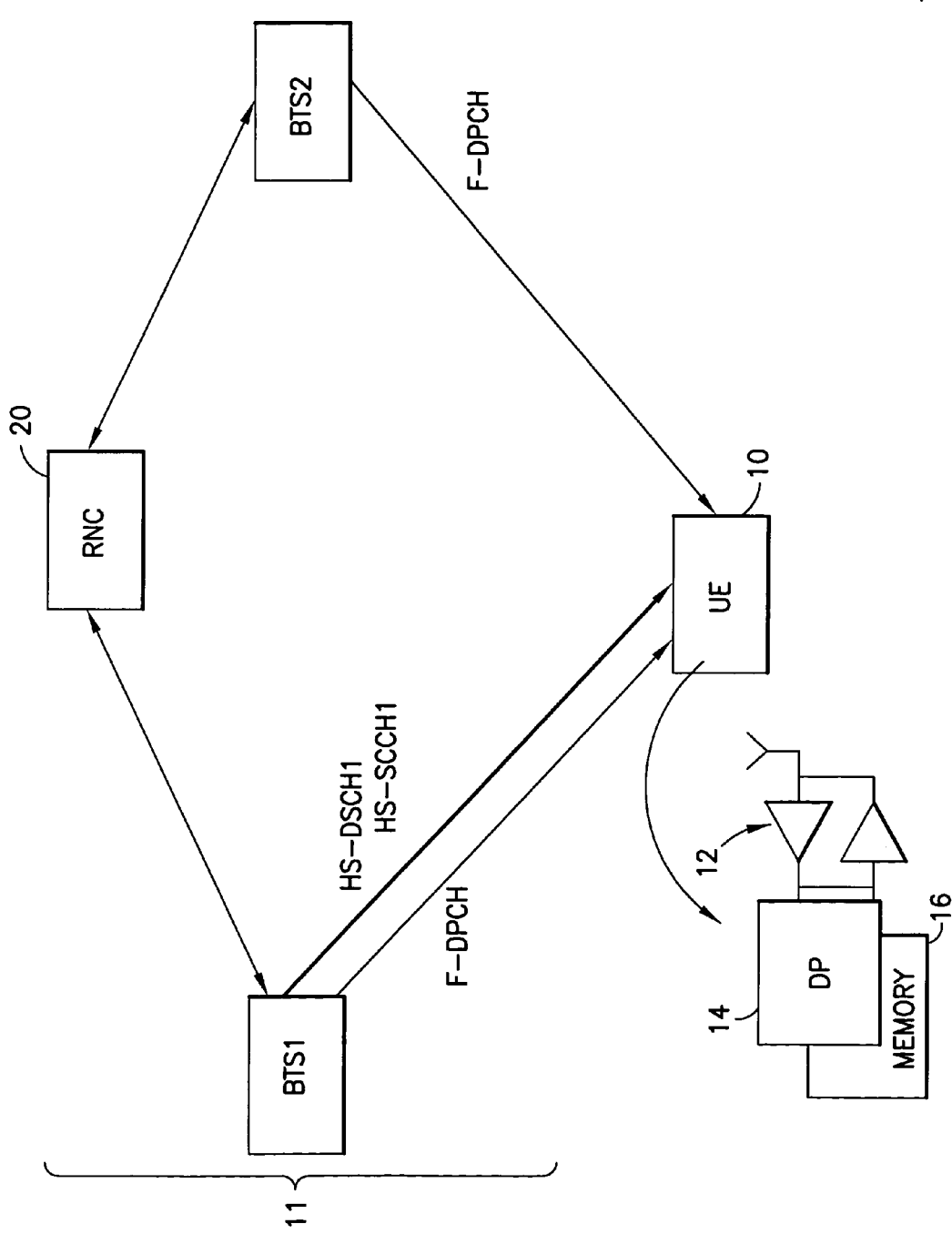
FIG. 1 is a simplified block diagram showing the major elements used to implement this invention.

With reference to FIG. 1, there is illustrated a simplified block diagram showing the major elements used to implement this invention, specifically a HSDPA terminal 10, also referred to as User Equipment (UE) 10, a first (currently serving) BTS (BTS1) and a second (target) BTS (BTS2).

As used herein, but not as a limitation on the practice of this invention, each BTS is assumed to be functionally equivalent to a 3GPP 25 series specification term Node B. Also whether the handover is inter-cell or intra-cell is not relevant to this invention. In general, handover is assumed to refer to the HSDPA terminal 10 cell change.

As illustrated in FIG. 1, the HSDPA terminal 10 includes a suitable wireless transceiver 12 coupled to a data processor (DP) 14 that in turn includes or is coupled to a volatile and/or non-volatile memory 16. DP 14 can be an integrated circuit operative on a computer chip. The memory 16 stores program code that is executable by the DP 14 to operate with the BTS1 and BTS2, including program code that is provided to implement the HSDPA terminal 10 aspects of this invention. Although not shown, it will be appreciated that each BTS is similarly constructed. The RNC 20 also includes a DP and a memory that stores program code that is executable by the RNC DP. The source Node B (BTS1), the target Node B (BTS2) and the RNC 20 can all be considered as network elements in the UTRAN 11.

In general, the various embodiments of the HSDPA terminal 10, also referred to herein as a UE 10, can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

In accordance with the exemplary embodiments of this invention an enhancement to the HSDPA serving cell change during the soft handover procedure, when the UE 10 is simultaneously receiving two or more DL signals, involves enhanced UE 10 behavior for generating F-DPCH power control commands for the case where multiple radio links with the F-DPCH are active. Specifically, the exemplary embodiments of this invention address operations by which a radio link or links is identified to which the UE 10 applies the quality target for the case where the F-DPCH is in a SHO condition.

As noted, meeting the quality target for all radio links in an active set of links assures one that the radio link from the HS-DSCH serving cell is taken into account when the UE 10 determines the power control commands. However, doing so can lead to excessive power being used for transmitting F-DPCH. In large active sets, some of the cells are typically not detectable and fulfilling the quality criteria for these signal unnecessarily boosts the power of the detectable cells.

If one were to meet the quality target for only one of the radio links, the performance of power control would typically be based on the quality target of the strongest link. A problem arises when the strongest link is not the link from the HS-DSCH serving cell. As the radio link failure criteria are based at least in part on the synchronization primitives estimated from the F-DPCH from the HS-DSCH serving cell, it is important that the power control is capable of adjusting the power of the F-DPCH from the HS-DSCH serving cell.

In accordance with the exemplary embodiments of this invention the UE 10 generates power control commands by applying the quality target to the radio link from the HS-DSCH serving cell only. This technique is compatible with the handling of downlink synchronization criteria with F-DPCH, which is evaluated based solely on a received TPC command quality from the HS-DSCH serving cell. When the UE 10 generates the power control commands so that the quality of the serving HS-DSCH serving cell is fulfilled, the downlink synchronization primitives can be employed to advantage as an indication of the HS-DSCH serving cell quality.

An autonomous UE 10 radio link failure criterion can also be employed, preferably one that is based on the downlink synchronization primitives. Furthermore it is known by the UTRAN to which NodeB the UE 10 bases it DL power control, enabling the power control command to be accounted for in other radio links if so desired.

Figure 2:
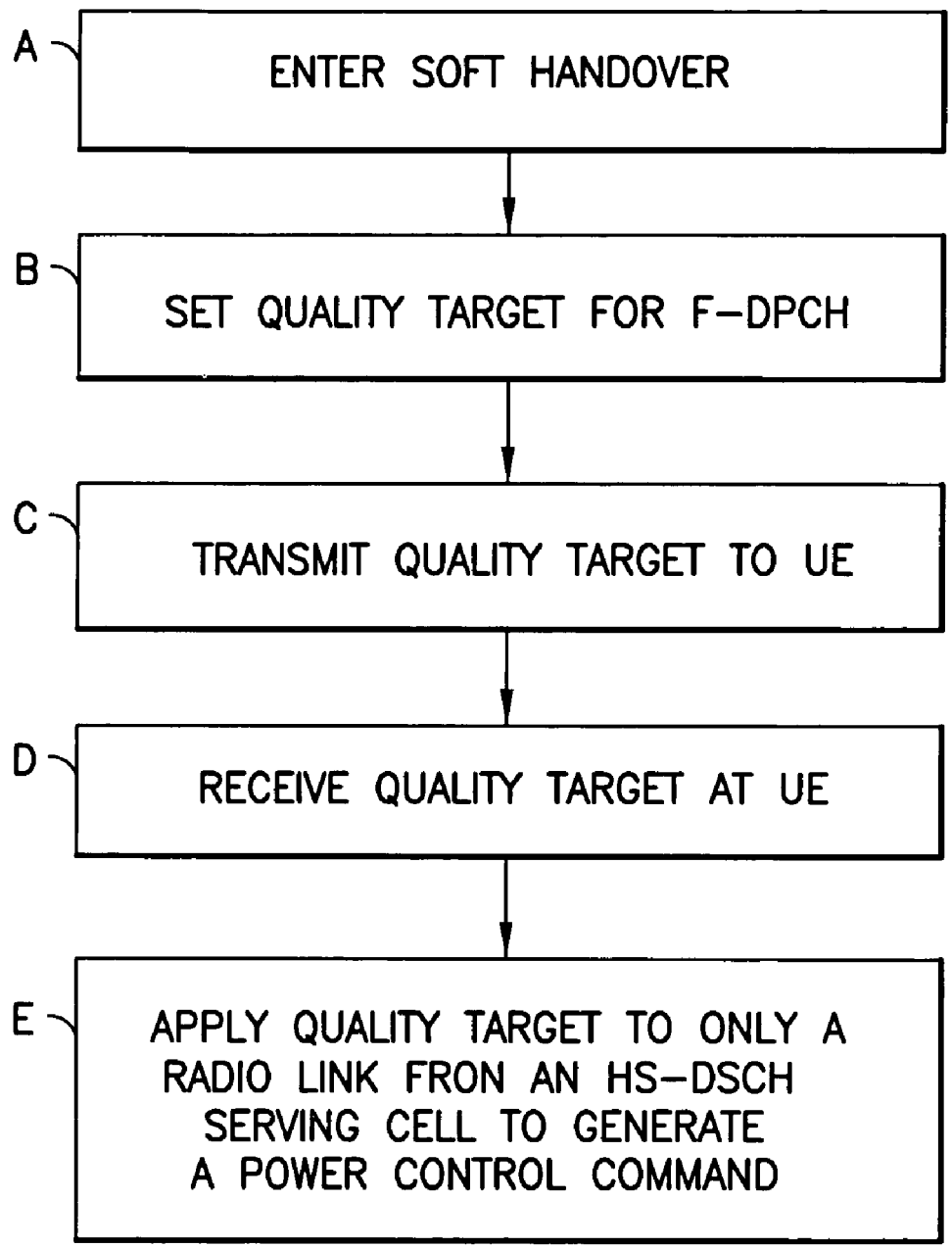
FIG. 2 is a diagram of an exemplary embodiment of a method of the invention.

With reference to FIG. 2, there is illustrated an exemplary embodiment of a method of the invention. At step A, the UE 10 commences to perform a soft handover. At such time, the UE 10 has established at least one radio link with BTS1 (HS-DSCH serving cell) and at least one radio link with BTS2 (the target cell). At step B, the UTRAN 11 sets a quality target for the F-DPCH. At step C, the UTRAN 11 transmits the quality target for reception by the UE 10, and the quality target is received at step D. The UE 10 autonomously sets a SIR target value and adjusts it in order to achieve the same quality as the quality target set by UTRAN 11. The quality target is set as a downlink TPC command error rate target value for the F-DPCH belonging to the radio link from the HS-DSCH serving cell as signaled by the UTRAN 11. The UE 10 sets the SIR target when the F-DPCH has been setup or reconfigured. The UE 10 does not increase the SIR target value before the power control has converged on the current value. The UE 10 may estimate whether the power control has converged on the current value, by comparing the averaged measured SIR to the SIR target value. Lastly at step E, the UE 10 generates power control commands by applying the quality target to the radio link from the HS-DSCH serving cell only. While the exemplary embodiment above describes the initiation of soft handover prior to signaling the quality target for the F-DPCH to the UE, the order in which these steps occur may differ from the order described and illustrated in FIG. 2.

In order to accommodate the TPC command quality from all F-DPCH, it is within the scope of this invention to permit non-serving cells to apply a downlink power offset.

Advantages that arise from the use of the exemplary embodiment of the invention include, but are not limited to, ensuring sufficient power from the HS-DSCH serving cell, and a compatibility with the radio link failure criterion for F-DPCH. Further, the network does not waste power on those radio links in the active set that are non-detectable.

Based on the foregoing description of non-limiting embodiments of this invention it can be appreciated that an aspect of this invention relates to apparatus, methods and a computer program to operate the UE 10 to perform a handover from a serving cell to a target cell by the UE generating power control commands by applying the quality target to the radio link from the HS-DSCH serving cell only.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   establishing, at an apparatus, a first radio link with a serving network entity and a second radio link with a target network entity;
   the apparatus commencing a soft handover from said serving network entity to said target network entity;
   the apparatus receiving a quality target from a network comprising the serving and target network entities, wherein said quality target comprises a downlink transmit power control command error rate target value; and
   the apparatus applying said quality target only to said first radio link to generate a power control command.

2. The method of claim 1 wherein said soft handover is characterized by the simultaneous reception of a first shared channel from said serving network entity and a second shared channel from said target network entity.

3. The method of claim 1 wherein said first and said second radio links are fractional dedicated physical channel radio links and said serving network entity is a high-speed downlink shared channel serving cell.

4. The method of claim 1 further comprising:
   setting a signal to interference ratio target value; and
   adjusting said signal to interference ratio target value to achieve a signal quality equal to said quality target.

5. The method of claim 1 further comprising transmitting said power control command.

6. A method comprising:
establishing, at an apparatus, a first radio link between a serving network entity and a user equipment and a second radio link between a target network entity and said user equipment;
the apparatus commencing a soft handover of said user equipment from said serving network entity to said target network entity;
the apparatus transmitting a quality target from a network comprising said serving network entity and said target network entity, wherein said quality target comprises a downlink transmit power control command error rate target value; and
the apparatus receiving a power control command from said user equipment generated in response to said transmission of said quality target using only said first radio link.

7. The method of claim 6 wherein said network is a universal mobile telecommunications system terrestrial radio access network.

8. The method of claim 6 wherein said soft handover is characterized by the simultaneous transmission of a first shared channel from said serving network entity and a second shared channel from said target network entity.

9. The method of claim 6 wherein said first and said second radio links are fractional dedicated physical channel radio links and said serving network entity is a high-speed downlink shared channel serving cell.

10. A memory embodying a program of machine-readable instructions, executable by a digital data processor, to perform actions directed toward handing over a mobile terminal between network entities, the actions comprising:
establishing a first radio link with a serving network entity and a second radio link with a target network entity;
commencing a soft handover from said serving network entity to said target network entity;
receiving a quality target from a network comprising the serving and target network entities, wherein said quality target comprises a downlink transmit power control command error rate target value; and
applying said quality target only to said first radio link to generate a power control command.

11. The memory of claim 10 further comprising transmitting said power control command.

12. The memory of claim 10 wherein said soft handover is characterized by the simultaneous reception of a first shared channel from said serving network entity and a second shared channel from said target network entity.

13. The memory of claim 10 further comprising:
setting a signal to interference ratio target value; and
adjusting said signal to interference ratio target value to achieve a signal quality equal to said quality target.

14. An apparatus comprising:
at least one processor;
memory storing a program of instructions;
wherein the program of instructions is configured to, with the memory and the at least one processor, cause the apparatus to at least:
establish a first radio link with a serving network entity and a second radio link with a target network entity;
commence a soft handover from said serving network entity to said target network entity;
receive a quality target from a network comprising the serving and target network entities, wherein said quality target comprises a downlink transmit power control command error rate target value; and
apply said quality target only to said first radio link to generate a power control command.

15. The apparatus of claim 14 wherein said means for establishing,
commencing, receiving, and applying comprises a data processor.

* * * * *